United States Patent Office 2,956,041
Patented Oct. 11, 1960

2,956,041

BLEND OF A VINYL CHLORIDE RESIN, A RUBBERY DIOLEFIN COPOLYMER AND A COPOLYMER OF ACRYLONITRILE AND ALKYL METHACRYLATE

Robert J. Reid, Canal Fulton, and Byron H. Werner, Akron, Ohio, assignors to The Firestone Tire & Rubber Company, Akron, Ohio, a corporation of Ohio No Drawing. Filed Aug. 12, 1957, Ser. No. 677,783

8 Claims. (Cl. 260—45.5)

This invention relates to a plastic composition composed largely of a polymeric vinyl resin. The resin is toughened by blending a rubber with it, and a resinous processing aid is added.

Thus, the composition includes essentially (1) a rigid polymeric vinyl resin, (2) a rubber copolymer formed from at least two monomers one of which is an ethylenically unsaturated diolefin, and (3) a resinous acrylonitrile-alkylmethacrylate copolymer. The blend is not as brittle as polyvinyl halide but is hard and tough and rigid.

The polymeric vinyl resin may be polyvinyl chloride or it may be a copolymer of vinyl chloride and other monomer which is copolymerizable therewith. The polymeric vinyl resin, rubber and processing aid are homogeneously mixed and produce a thoroughly compatible mixture. The blends have high impact strength which in sheet materials is evidenced by toughness, while retaining the desirable properties of the resin substantially intact. During vacuum forming these blends do not thin out and tear at points of stress, a fault common to blends of vinyl halide polymers now on the market. The blends have good calendering properties and can be molded and extruded. Products made from the blends are postformable.

With every 100 parts of the polyvinyl chloride or a copolymer derived from vinyl chloride and not more than 15 parts of resin-producing monomer, there is blended 5 to 20 parts of the rubber copolymer and 3 to 15 parts of the acrylonitrile-alkylmethacrylate resinous copolymer.

There are various vinyl resins derived from at least 85 percent of vinyl chloride now on the market. Any of these may be used in preparing the blends of this invention. Monomers that can be copolymerized with vinyl chloride to produce polymeric vinyl resin useful in carrying out the invention are from the class consisting of vinyl esters of aliphatic or aromatic acids including, for instance, vinyl acetate, vinyl chloroacetate, vinyl formate, vinyl propionate, a vinyl butyrate, or ester of other fatty acid up to and including vinyl stearate, vinyl benzoate, vinyl methoxybenzoate, vinyl salicylate, also vinylidene chloride, dialkyl fumarates and dialkyl maleates, etc.

The second component of the blend is referred to above as a rubber copolymer. It is compatible with the vinyl resin and is formed from butadiene or isoprene or other ethylenically unsaturated diolefin and a monomer of the class consisting of acrylonitrile, alkyl acrylates and methacrylates in which the alkyl group contains one to thirteen carbon atoms, vinylidene chloride, methyl-isopropenyl ketone, methyl-vinyl ketone, dialkyl fumarates in which the alkyl groups each contain no more than eight carbon atoms such as diethyl fumarate, monovinyl pyridine, etc. Ten to 50 parts of acrylonitrile or other such monomer is copolymerized with 90 to 50 parts of butadiene or other ethylenically unsaturated diolefin, preferably by emulsion copolymerization using a free-radical-generating catalyst, but any method of production may be employed. This second component toughens the composition.

The third component of the blend is a resinous acrylonitrile-alkyl (1 to 3 carbon atoms) methacrylate copolymer which enhances the processing properties of the blend, and imparts good hot strength. This resinous material is formed from 10 to 50 parts of acrylonitrile and 90 to 50 parts of methyl, ethyl or propyl methacrylate. It may be produced in any desirable manner but is preferably formed by emulsion polymerization in the presence of a free-radical-generating catalyst.

The three components of the blend may be mixed in any desired order. Latexes of two or all three of the components may be mixed and coagulated together, or the several coagula may all be milled together on a roll mill or in a Banbury. If mixed by some means other than by milling, the mix is preferably milled subsequently at temperatures of 200 to 400° F. to produce a homogeneous blend. The blend may then be sheeted out or calendered or processed in any suitable manner.

The following example illustrates the preparation of the third component of the mixture. It is identified in the following blend formulae as resinous copolymer A. In its preparation these materials were used in the amounts given:

| | |
|---|---|
| Methyl methacrylate | 112.5 |
| Acrylonitrile | 37.5 |
| Distilled water | 300.0 |
| Soap flakes | 5.0 |
| Potassium persulfate | 0.75 |

The mixture was agitated in 26-oz. bottles for 20 hours at 50° C. The resulting copolymer emulsion was coagulated in one-percent calcium chloride. The coagulum was filtered, washed and dried at 65° C. for 15 to 20 hours. A fine white powder was obtained.

The foregoing resinous copolymer was used in two different blends according to the following formulae. The polyvinyl chloride used in each blend was a homopolymer known commercially as Exon 402A. Other polyvinyl resins derived from at least 85 parts of vinyl chloride can be used equally well.

Blend No. 1

The rubbery copolymer used in the blend was obtained from the following recipe:

| | Parts by weight |
|---|---|
| Butadiene | 105 |
| Methyl methacrylate | 45 |
| Deionized water | 270 |
| Potassium persulfate | 0.3 |
| Soap flakes | 7.5 |
| Dodecyl mercaptan | 0.25 |

The polymerization was carried out in bottles with agitation for 24 hours at 50° C. The reaction was stopped by the addition of a conventional stopping agent. Antioxidant was added to the latex; it was coagulated and dried in conventional manner.

The following components were then blended on a 10-inch laboratory mill with the mill rolls at about 300–320° F. and the stock at 340–350° F. for about 8 minutes.

| | Parts |
|---|---|
| Polyvinyl chloride | 100 |
| Titanium dioxide | 19 |
| Resinous copolymer A | 7 |
| Butadiene-methyl methacrylate | 12 |
| Thermolite 31 [1] | 3 |

[1] A sulfur-containing organotin compound sold by Metal and Thermit Corp., 100 E. 42nd Street, New York, New York. Other vinyl stabilizers can be used.

Blend No. 2

Ordinary nitrile rubber derived from 85 parts of butadiene and 15 parts of acrylonitrile was used in the blend.

The following components were used:

| | Parts |
|---|---|
| Polyvinyl chloride | 100 |
| Titanium dioxide | 19 |
| Resinous copolymer A | 7 |
| Nitrile rubber | 12 |
| Thermolite 31 | 3 |

These materials were blended at the same temperature and for the same time as Blend No. 1.

The physical properties of these blends were determined and are recorded below where they are compared with the properties of the polyvinyl chloride used in their preparation. In the table, "impact" refers to the notched Izod impact strength at room temperature measured in pounds per square inch of notch; the "hardness" refers to Rockwell R; "modulus" is recorded in pounds per square inch; and "Ht. D." stands for heat distortion temperature.

| | Impact, ft./lb. | Hardness | Modulus | Ht. D., °C. |
|---|---|---|---|---|
| Blend No. 1 | 17.4 | 102 | 285,000 | 80 |
| Blend No. 2 | 16.9 | 100 | 266,500 | 80 |
| Exon 402A | 0.5 | 117 | 450,000 | 75 |

The titanium dioxide may be omitted or replaced with other pigments used with polyvinyl chloride. The amount of the various components may be varied within the ranges set forth above.

These blends are to be preferred over polyvinyl chloride were high impact strength is desired. They may be molded, extruded, etc. and sheeted out to sheets of different thicknesses as required for the multitude of uses in industry where polyvinyl chloride is now used, and the further uses where a higher impact material is required. They are suitable for use in panels for various structures, trays, kick panels for automobile doors, etc.

What we claim is:

1. A blend consisting essentially of (1) 100 parts of a polyvinyl resin of the class consisting of polyvinyl chloride and copolymers of a mixture of 85 to 100 parts of vinyl chloride and up to 15 parts of an ethylenically unsaturated monomer that is copolymerizable therewith; (2) 5 to 20 parts of a rubbery copolymer of a mixture of 50 to 90 parts of conjugated diolefin monomer and 50 to 10 parts of at least one monomer from the class consisting of acrylonitrile, methacrylonitrile, alkyl acrylates and methacrylates having one to thirteen carbon atoms in the alkyl group, vinylidene chloride, methylisopropenyl ketone, dialkyl fumarates in which each alkyl group contains one to eight carbon atoms, monovinyl pyridine, and methyl-vinyl ketone; and (3) 3 to 15 parts of a copolymer of a mixture consisting of 10 to 50 parts of acrylonitrile and 90 to 50 parts of an alkyl methacrylate which contains 1 to 3 carbon atoms in the alkyl group.

2. The blend of claim 1 in which the second component is a copolymer from a mixture of butadiene and methyl methacrylate.

3. The blend of claim 1 in which the second component is a copolymer from a mixture of butadiene and acrylonitrile.

4. The blend of claim 1 in which the third component is a copolymer from a mixture consisting of acrylonitrile and methyl methacrylate.

5. The blend of claim 1 in which the second component is a copolymer from a mixture of butadiene and methyl methacrylate and the third component is a copolymer from a mixture consisting of acrylonitrile and methyl methacrylate.

6. The blend of claim 1 in which the second component is a copolymer from a mixture of butadiene and acrylonitrile and the third component is a copolymer from a mixture consisting of acrylonitrile and methyl methacrylate.

7. The blend of claim 1 in which the second component is a copolymer from a mixture of butadiene and methyl methacrylate and the third component is 4 to 12 parts of a copolymer from a mixture consisting of about 25 parts of acrylonitrile and 75 parts of methyl methacrylate.

8. The blend of claim 1 in which the second component is a copolymer from a mixture of butadiene and acrylonitrile and the third component is 4 to 12 parts of a copolymer of a mixture consisting of about 25 parts of acrylonitrile and 75 parts of methyl methacrylate.

References Cited in the file of this patent

UNITED STATES PATENTS

| | | |
|---|---|---|
| 2,538,779 | Harrison et al. | Jan. 23, 1951 |
| 2,688,008 | Chaney et al. | Aug. 31, 1954 |
| 2,753,322 | Parks et al. | July 3, 1956 |
| 2,791,600 | Schwaegerle | May 7, 1957 |
| 2,807,603 | Parks et al. | Sept. 24, 1957 |
| 2,808,387 | Parks et al. | Oct. 1, 1957 |